(12) United States Patent
Mizushima (10) Patent No.: US 12,390,881 B2
(45) Date of Patent: Aug. 19, 2025

(54) LASER WELDING METHOD (71) Applicant: TOYOTA JIDOSHA KABUSHIKI KAISHA, Toyota (JP)

(72) Inventor: Daisuke Mizushima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 757 days.

(21) Appl. No.: 17/717,699

(22) Filed: Apr. 11, 2022

(65) Prior Publication Data
US 2022/0371123 A1    Nov. 24, 2022

(30) Foreign Application Priority Data

May 18, 2021 (JP) .................................. 2021-084082

(51) Int. Cl.
*H02K 15/00* (2025.01)
*B23K 26/06* (2014.01)
*B23K 26/21* (2014.01)
*B23K 26/322* (2014.01)
*H02K 15/35* (2025.01)
*B23K 101/36* (2006.01)

(52) U.S. Cl.
CPC ............ *B23K 26/21* (2015.10); *B23K 26/322* (2013.01); *H02K 15/35* (2025.01); *B23K 2101/36* (2018.08)

(58) Field of Classification Search
CPC ......... H02K 15/00; B23K 26/06; B23K 26/22
See application file for complete search history.

(56) References Cited

U.S. PATENT DOCUMENTS

| 10,717,153 | B2* | 7/2020 | Nakamura | H01R 4/021 |
| 2018/0036836 | A1* | 2/2018 | Nakamura | B23K 26/0736 |
| 2019/0199153 | A1* | 6/2019 | Nishimura | H02K 15/35 |
| 2020/0083787 | A1* | 3/2020 | Fujiyoshi | H02K 15/35 |
| 2020/0112236 | A1* | 4/2020 | Hirao | H01R 4/029 |

FOREIGN PATENT DOCUMENTS

| CN | 107671420 A | 2/2018 |
| JP | 2018-20340 A | 2/2018 |
| JP | 2018-30155 A | 3/2018 |
| JP | 2019-140839 A | 8/2019 |
| JP | 2019-181506 A | 10/2019 |

* cited by examiner

*Primary Examiner* — Ibrahime A Abraham
*Assistant Examiner* — Lawrence H Samuels
(74) *Attorney, Agent, or Firm* — Sughrue Mion, PLLC (57) ABSTRACT

A laser welding method according to this disclosure is a laser welding method for welding first and second coils (members) to each other by applying a laser beam to the first and second coils in a state where the first and second coils are brought into contact with each other. The laser welding method includes: a first step of forming a weld pool by applying a laser beam to the first coil; and a second step of continuing the application of the laser beam to the first coil until the width of a bridge formed between the first and second coils becomes wider than the width of the laser beam, the bridge being formed such that the weld pool is attached to the second coil by growing.

3 Claims, 9 Drawing Sheets

LASER WELDING METHOD

CROSS-REFERENCE TO RELATED APPLICATION

This application claims priority to Japanese Patent Application No. 2021-084082 filed on May 18, 2021, incorporated herein by reference in its entirety.

BACKGROUND

1. Technical Field

This disclosure relates to a laser welding method.

2. Description of Related Art

Laser beam welding is known as a welding method for a stator coil. In a case where laser beam welding is used, the dimension of a welded portion can be made compact in comparison with a case where conventional TIG arc welding is used, and this makes it possible to downsize a whole product dimension.

As a related art, Japanese Unexamined Patent Application Publication No. 2019-140839 (JP 2019-140839 A) describes a manufacturing method for a rotary electric machine. The manufacturing method can prevent or restrain an insulating coating from being damaged in a case where a coil wire is welded to a neutral line in the rotary electric machine. The manufacturing method described in JP 2019-140839 A includes: a placing step of placing, in a contacting manner, a connection part set in a coating-peeled part in an end part of a coil wire covered with an insulating coating and a connection part set in a neutral line; and a welding step of performing laser beam welding on a contact portion such that a side closer to the insulating coating is set as a staring point and a side distant from the insulating coating is set as an end point. The starting point of the laser beam welding is an end part of the contact portion that is closer to the insulating coating, and the end point of the laser beam welding is an end part of the contact portion that is distant from the insulating coating. On the side closer to the insulating coating, it is possible to achieve a relatively small amount of heat to be input by the welding in comparison with the side distant from the insulating coating.

SUMMARY

Figure 9A:
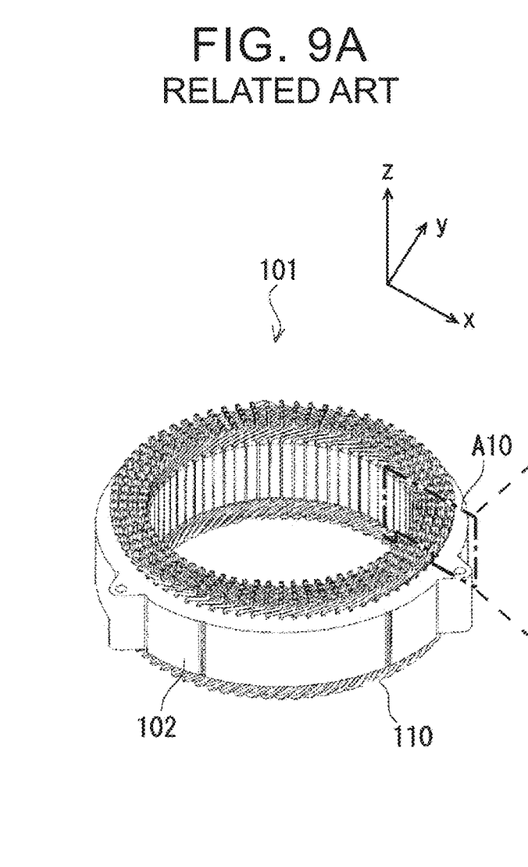
FIG. 9A is an explanatory view illustrating a laser welding method according to a related art.

With reference to FIGS. 9A, 9B, 9C, problems of this disclosure will be described. FIG. 9A is a view illustrating a schematic configuration of a stator 101 according to another related art. The stator 101 includes a stator core 102 and a plurality of coils 110. The stator core 102 is configured such that annular electromagnetic steel sheets are laminated in the axial direction of the stator 101 (the z-axis direction in FIG. 9A). The coils 110 are mounted on respective slots provided on an inner peripheral surface of the stator core 102, and respective end parts (coil ends) of the coils 110 project from an upper end surface of the stator core 102.

Figure 9B:
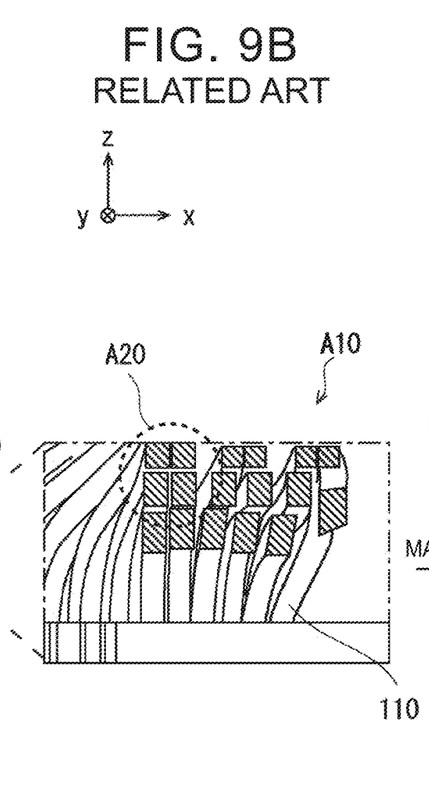
FIG. 9B is an explanatory view illustrating the laser welding method according to the related art.

FIG. 9B is a view illustrating, in a magnified manner, the vicinity of an end part of a section A10 of the coils 110 along the axial direction in FIG. 9A. As illustrated in FIG. 9B, the coils 110 are provided such that coils 110 adjacent to each other in the radial direction of the stator 101 (the x-axis direction in FIG. 9B) are paired. Respective end parts of the paired coils 110 are brought into contact with each other and are subjected to a laser beam from above. Hereby, the coils 110 can be joined to each other.

Figure 9C:
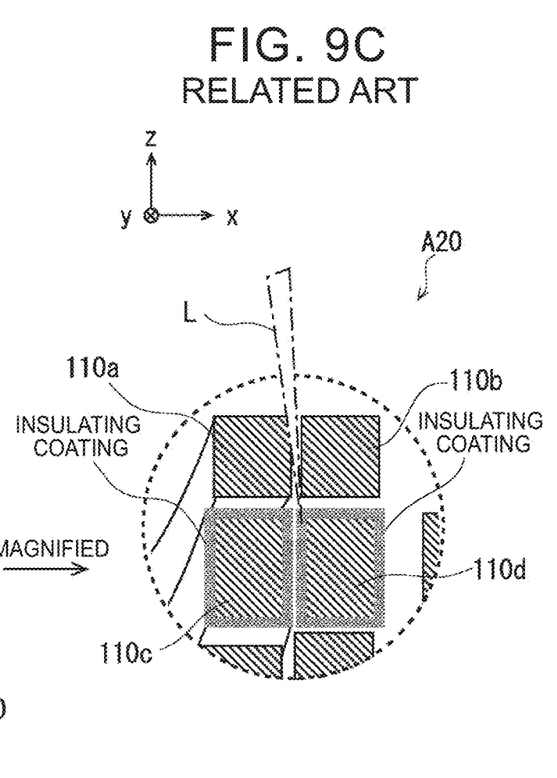
FIG. 9C is an explanatory view illustrating the laser welding method according to the related art.

FIG. 9C is a view illustrating a partial region A20 in FIG. 9B in a further magnified manner. In FIG. 9C, coils 110a, 110b are adjacent to each other in the radial direction (the x-axis direction in FIG. 9C). In a state where respective end parts of the coils 110a, 110b are brought into contact with each other, the respective end parts are subjected to a laser beam L from above. Hereby, the coils 110a, 110b can be joined to each other.

Here, like the example illustrated in FIG. 9C, other members including coils 110c, 110d may be placed below the coils 110a, 110b. Here, the coils 110a, 110b are targeted for welding, but the coils 110c, 110d and so on placed below the coils 110a, 110b are not targeted for welding. In order to perform welding, metallic materials are exposed in the respective end parts of the coils 110a, 110b targeted for welding. In the meantime, the coils 110c, 110d that are not targeted for welding are covered with insulating coatings, as illustrated in FIG. 9C.

For example, a single mode laser with a spot diameter of 0.1 mm is used as the laser beam L. The single mode laser has a high energy density and can weld coils to each other while a deep keyhole is formed. Accordingly, the single mode laser is good at efficiently melting, with a little heat, copper or the like that is hard to melt. However, in a case where there is a gap of 0.05 mm or more on a contacting face for welding between the coil 110a and the coil 110b, the laser beam L might penetrate through the contacting face, and the insulating coatings of the coil 110c and the coil 110d below the coil 110a and the coil 110b might be burned out. The burnout of the insulating coatings can cause serious material defects that directly lead to poor insulation.

In order to solve such a problem, it is conceivable to use a jig configured to clamp coils highly accurately so as not to generate a gap of 0.05 mm or more on a contacting face for welding. However, in a case where such a jig is provided, the productivity of products does not improve because of restrictions on a space for the jig, and the manufacturing cost increases.

This disclosure is accomplished in view of the above problems, and an object of this disclosure is to provide a laser welding method that can reduce such a risk that a laser beam penetrates through between members targeted for welding.

A laser welding method according to this disclosure is a laser welding method for welding a first member and a second member to each other by applying a laser beam to the first member and the second member in a state where the first member and the second member are brought into contact with each other. The laser welding method includes: a first step of forming a weld pool by applying the laser beam to the first member; and a second step of continuing the application of the laser beam to the first member until a width of a bridge formed between the first member and the second member becomes wider than a width of the laser beam, the bridge being formed such that the weld pool is attached to the second member by growing.

With this disclosure, it is possible to provide a laser welding method that can reduce such a risk that a laser beam penetrates through between members targeted for welding.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A concrete embodiment to which this disclosure is applied will be described in detail with reference to the drawings. However, this disclosure is not limited to the following embodiment. Further, the following description and drawings are simplified appropriately to make the description clear.

Figure 1:
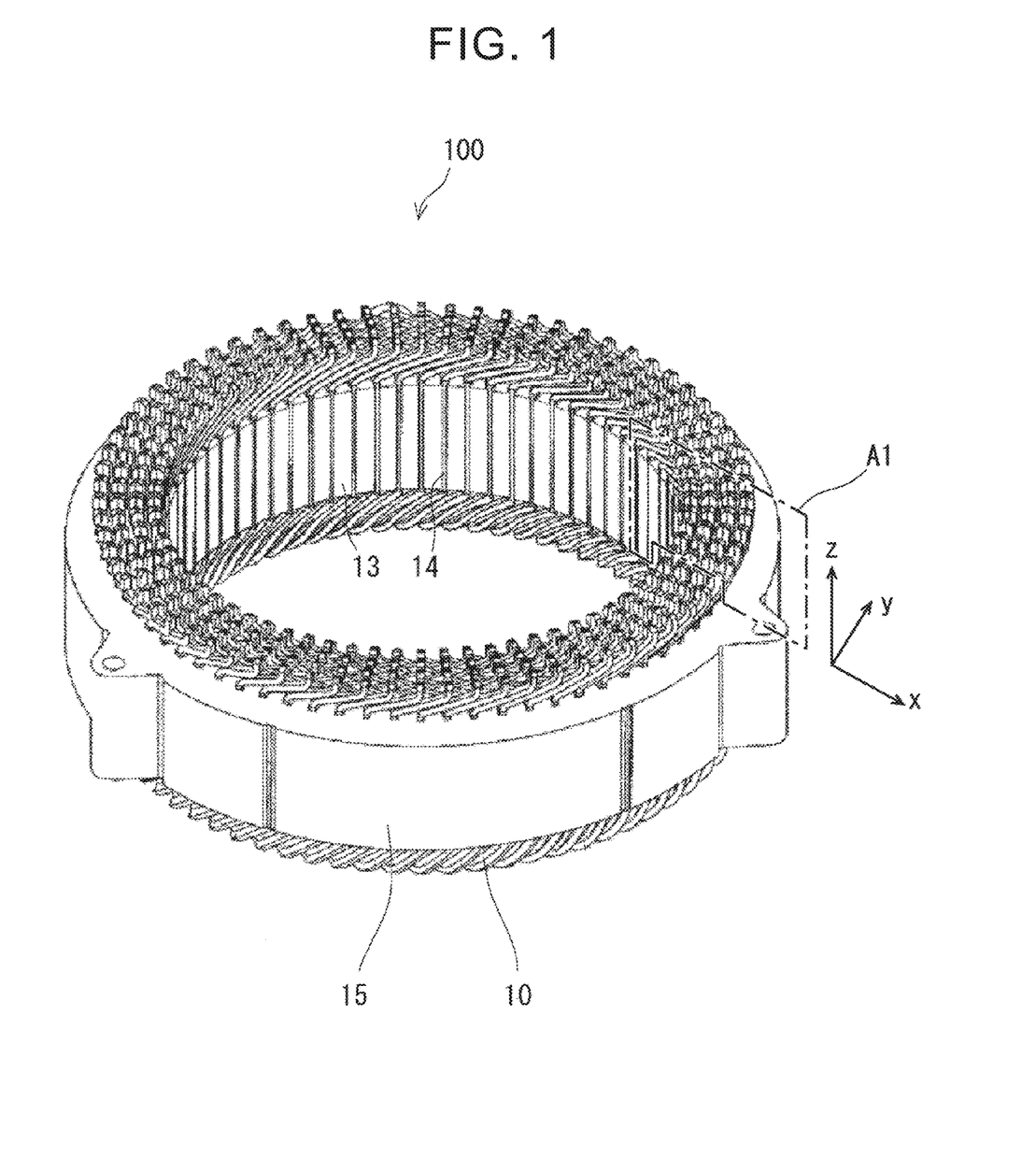
FIG. 1 is a perspective view illustrating a schematic configuration of a stator.

First, with reference to FIG. 1, a configuration of a stator 100 including coils 10 to be welded by use of a laser welding method according to the present embodiment will be described. FIG. 1 is a perspective view illustrating a schematic configuration of the stator 100. As illustrated in FIG. 1, the stator 100 that is a stator for a motor includes a stator core 15 and a plurality of coils 10.

The stator core 15 is configured such that annular electromagnetic steel sheets are laminated in the axial direction of the stator 100 (the z-axis direction in FIG. 1). The stator core 15 has a generally cylindrical shape as a whole. On an inner peripheral surface of the stator core 15, teeth 13 projecting toward the inner peripheral side and extended in the axial direction of the stator 100, and slots 14 as grooves each formed between adjacent teeth 13 are provided. The coils 10 are mounted in the slots 14. The coil 10 is formed generally in a U-shape, and both end parts of the coil 10 project from an upper end surface of the stator core 15.

The coil 10 may be an electric wire having a rectangular section, that is, a flat wire, for example. Further, generally, the coil 10 is made of pure copper, but the coil 10 is not limited to this. The coil 10 may be made of a metallic material having a high conductivity such as aluminum or an alloy mainly containing copper or aluminum.

The xyz right-handed coordinate system illustrated in FIG. 1 is illustrated for convenience of description of a positional relationship between constituents. Generally, a z-axis positive side represents a vertically upper side, and an xy-plane represents a horizontal plane. This is common between the figures. The x-axis represents the radial direction of the stator 100. Herein, a direction directed outwardly from the center of the stator 100 is defined as an x-axis positive direction. Further, the y-axis represents the circumferential direction of the stator 100. On a section A1 of the coil 10 along the axial direction in FIG. 1, a direction directed from the near side on the plane of paper toward the depth side is defined as a y-axis positive direction. Further, the z-axis represents the axial direction of the stator 100. A direction directed from bottom up along the vertical direction of the stator 100 is defines as a z-axis positive direction.

In the present embodiment, respective end parts of coils 10 adjacent to each other in the radial direction (the x-axis direction) are welded to each other by a laser beam L, so that a joined portion 20 (described later) is formed. The coils 10 adjacent to each other are paired to form one joined portion 20, so that a plurality of joined portions 20 is formed in the whole stator 100. The joined portions 20 may be arranged in a toric shape along the circumferential direction of the stator core 15. Further, the joined portions 20 thus arranged in a toric shape may be placed in a plurality of rows along the radial direction.

Figure 2:
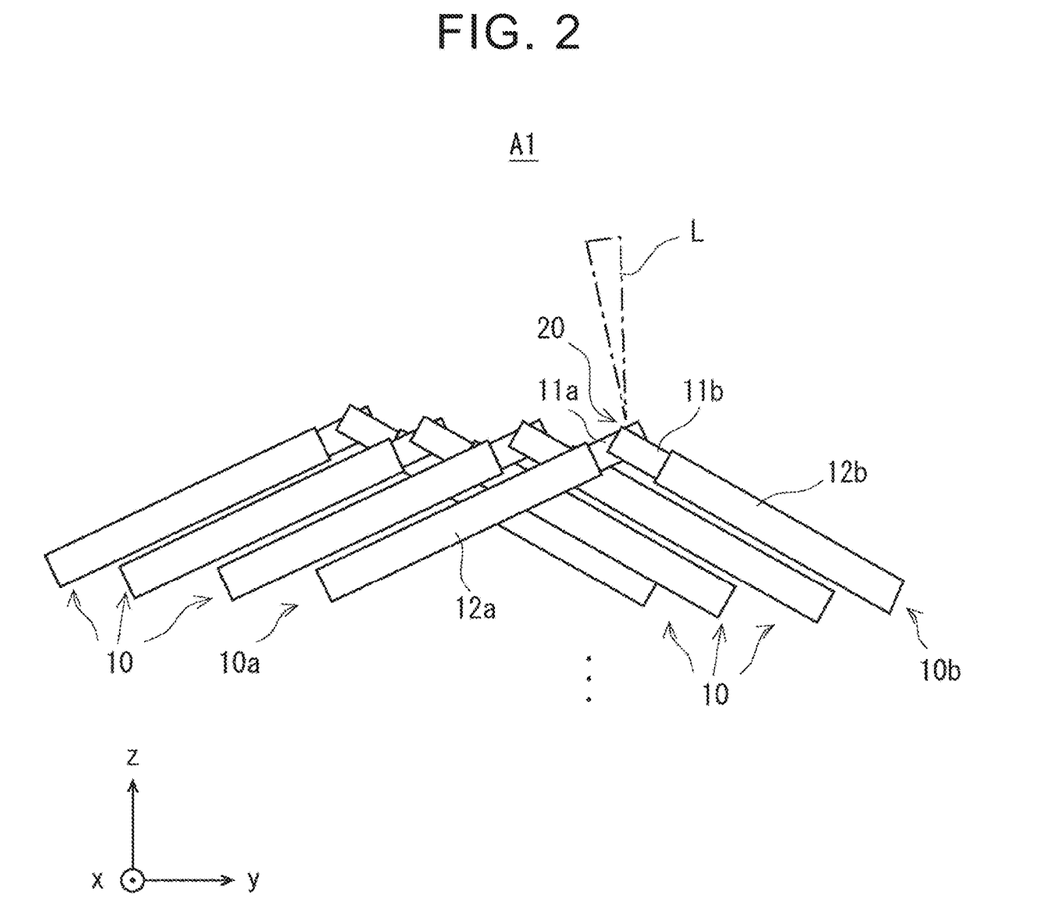
FIG. 2 is a view diagrammatically illustrating end parts of coils.

FIG. 2 is a view diagrammatically illustrating ends of the coils 10 by enlarging the vicinity of the section A1 of the coils 10 in FIG. 1. Each of the coils 10 is paired with its adjacent coil 10 in the radial direction. In FIG. 2, for example, four pairs of coils 10 are illustrated. Respective end parts of the adjacent coils 10 are brought into contact with each other, and an abutment part between the end parts is subjected to the laser beam L, so that the joined portion 20 is formed between the coils 10. Hereby, the adjacent coils 10 can be welded to each other.

The following description deals with, as an example, a case where a coil 10a (a first member) and a coil 10b (a second member) illustrated in FIG. 2 are welded to each other by applying the laser beam L to the coils 10a, 10b in a state that the coils 10a, 10b are brought into contact with each other.

As illustrated in FIG. 2, the coils 10a, 10b are covered with insulating coatings 12a, 12b, respectively. The insulating coatings 12a, 12b may be insulating coatings formed by baking an enamel material or coating with vinyl-chloride-based resin or the like. Further, in respective end parts 11a, 11b of the coils 10a, 10b, the insulating coatings 12a, 12b are peeled off, so that a metallic material (e.g., copper) is exposed. By applying the laser beam L to the end parts 11a, 11b to form the joined portion 20, the coils 10a, 10b are welded to each other.

A plurality of joined portions 20 is formed by welding respective end parts of coils 10 adjacent to each other in the radial direction such that the joined portions 20 are arranged in a toric shape along the circumferential direction of the stator core 15. Further, the joined portions 20 arranged in a toric shape are placed in a plurality of rows in the radial direction.

The coils 10a, 10b may be placed at a position where the laser beam L can be applied to members other than the coils 10a, 10b in a case where the laser beam L penetrates through the coils 10a, 10b. Here, a plurality of other coils 10 not targeted for welding is placed below the coils 10a, 10b (in a z-axis negative direction). The coils 10 not targeted for welding are fully covered with insulating coatings 12, including their end parts. Accordingly, in a case where the laser beam L penetrates through a gap between the coils 10a, 10b at the time when the laser beam L is applied to the coil 10a, 10b placed above the coils 10 not targeted for welding, the coils 10 not targeted for welding might be burned out.

Next will be described a laser welding method according to the present embodiment with reference to FIGS. 3 to 6. FIGS. 3 to 6 are side views each illustrating the vicinity of the joined portion 20 between the coils 10a, 10b. As the laser beam L, a wide laser beam to be emitted from a laser light source of around 1.0 mm may be selected, for example. The laser beam L may be ring mode laser or the like, for example.

Figure 3:
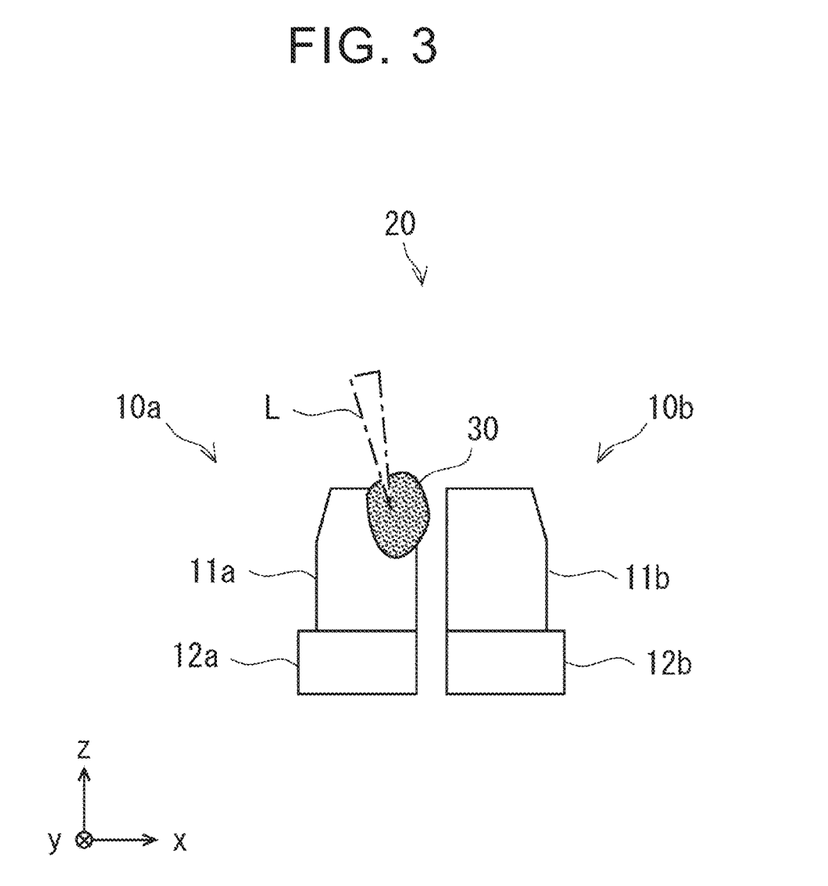
FIG. 3 is a side view of a joined portion and illustrates a laser welding method according to an embodiment.

FIG. 3 is a view to describe a first step. As illustrated in FIG. 3, first, the laser beam L is applied to the end part 11*a* of the coil 10*a* so as to form a weld pool 30 in the end part 11*a* (the first step).

Figure 4:
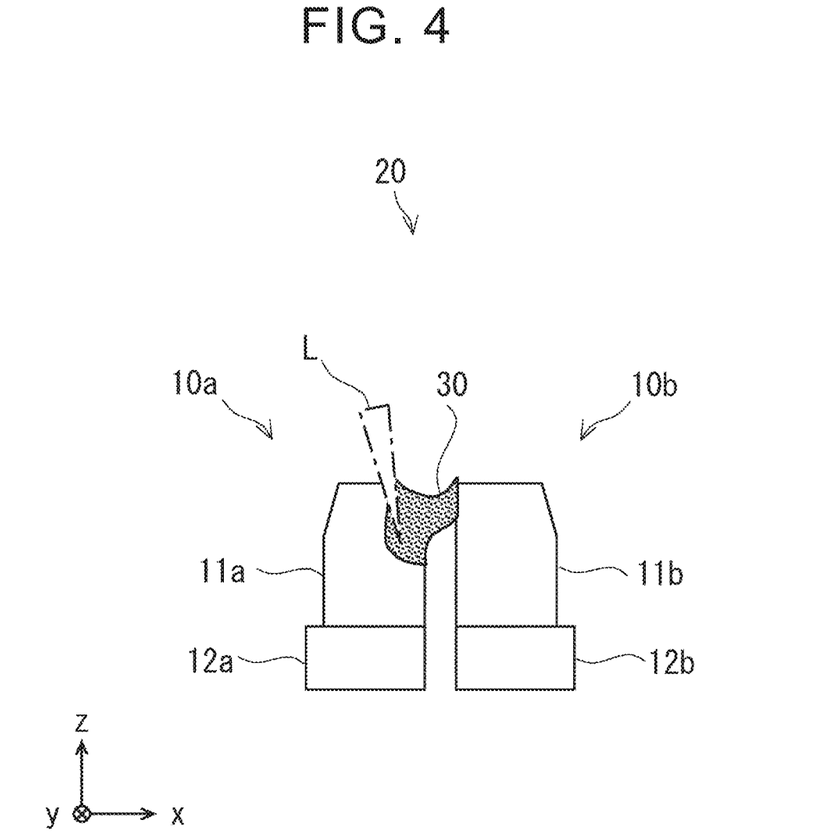
FIG. 4 is a side view of the joined portion and illustrates the laser welding method according to the embodiment.

FIG. 4 is a view to describe a second step. The application of the laser beam L is continued at a fixed point in the end part 11*a* so as to grow the weld pool 30. Due to the growth and vibration of the weld pool 30, the weld pool 30 is attached to the end part 11*b*. Hereby, a bridge (coating) by the weld pool 30 is formed between the end parts 11*a*, 11*b*. After the bridge is formed, the application of the laser beam L to the end part 11*a* is continued until the width of the bridge formed between the end parts 11*a*, 11*b* becomes wider than a width W (not illustrated) of the laser beam L (the second step).

Here, the width W of the laser beam L represents the spot diameter of the laser beam L applied to the end parts 11*a*, 11*b*. In a case where the laser beam L has a circular shape, for example, the width W of the laser beam L may be the diameter of the laser beam L at an application position where the laser beam L is applied to the end parts 11*a*, 11*b*. Further, in a case where the laser beam L has an elliptical shape, the width W of the laser beam L may be the long diameter or the short diameter of the laser beam L at the application position. The bridge is formed by continuing the application of the laser beam L to the end part 11*a* in consideration of the width W of the laser beam L or the shape of the laser beam L so that the laser beam L does not penetrate through a gap between the end parts 11*a*, 11*b*. Thus, the bridge of the weld pool 30 is formed between the end parts 11*a*, 11*b* such that the bridge has a width wider than the width W of the laser beam L.

Note that, in the second step, a time during which the application of the laser beam L to the end part 11*a* is continued may be set in advance. For example, an appropriate application time can be set in advance such that an image of a welding state is captured by use of a high-speed camera, and the depth of the welding or the like on a sectional view of the joined portion 20 in the middle of the welding or after the welding is observed. By setting the application time in advance, it is possible to perform the welding efficiently. In addition, it is possible to restrain occurrence of defects.

Figure 5:
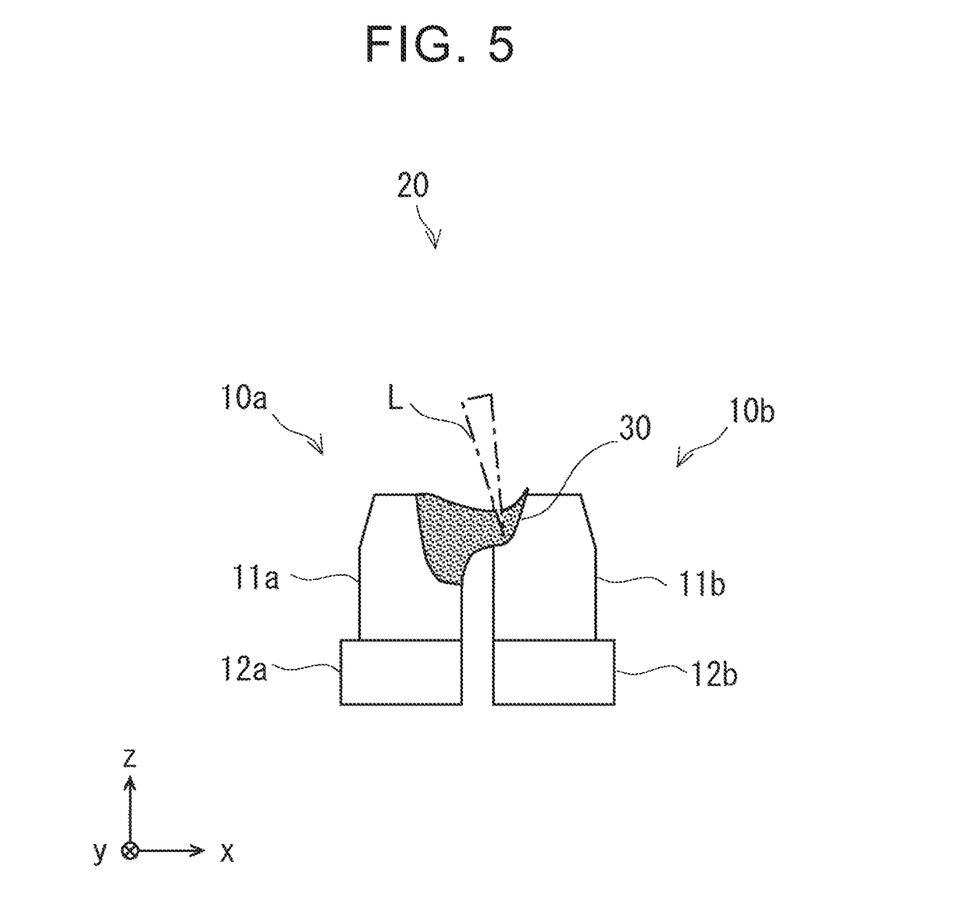
FIG. 5 is a side view of the joined portion and illustrates the laser welding method according to the embodiment.

Subsequently, as illustrated in FIG. 5, the laser beam L is moved from the end part 11*a* to the end part 11*b* such that the laser beam L moves over the bridge. Since the bridge is formed to be wider than the width W of the laser beam L, the laser beam L can be moved without causing the laser beam L to penetrate through between the end parts 11*a*, 11*b*.

Figure 6:
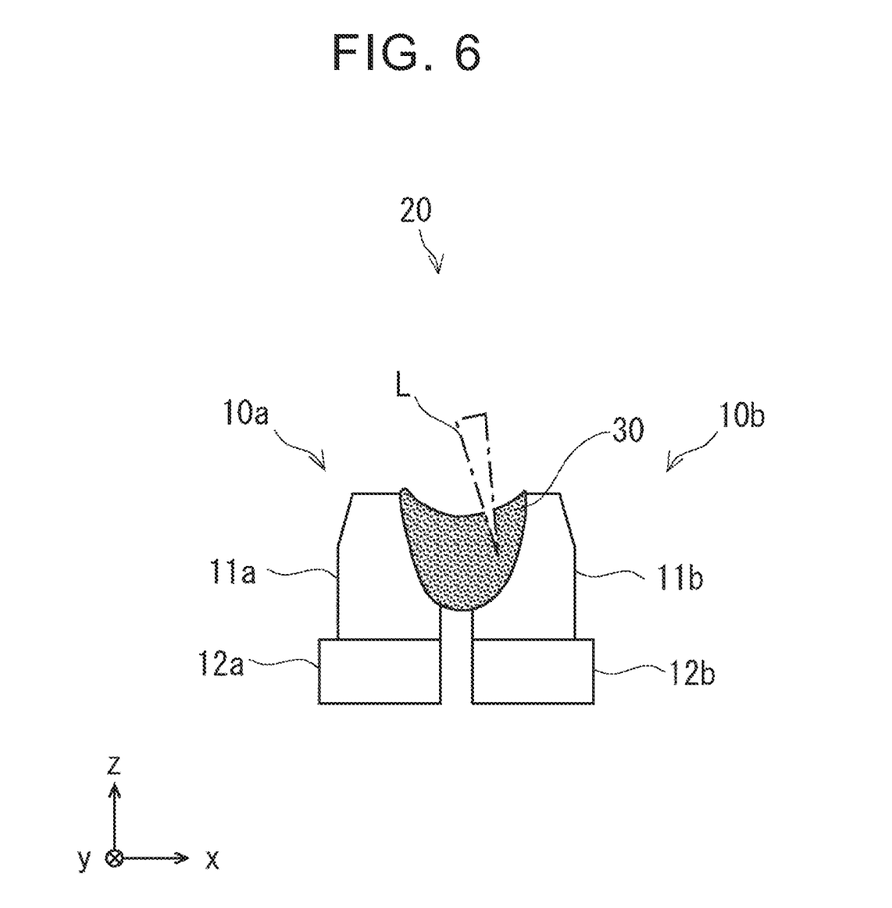
FIG. 6 is a side view of the joined portion and illustrates the laser welding method according to the embodiment.

Subsequently, as illustrated in FIG. 6, the application of the laser beam L to the end part 11*b* is continued until weld-penetration of the coil is deepened sufficiently in the end part 11*b*. Hereby, the joined portion 20 by the weld pool 30 is formed between the end parts 11*a*, 11*b*. Note that the application time of the laser beam L to the end part 11*b* may be set in advance by use of a high-speed camera or the like, similarly to the application time to the end part 11*a*.

By performing the above process repeatedly in accordance with the length (in the y-axis direction) of the gap to be filled between the end parts 11*a*, 11*b*, the welding between the coils 10*a*, 10*b* can be completed.

Next will be described the abovementioned process viewed from a different direction with reference to FIGS. 7, 8. Further, the following description deals with a case where the abovementioned process is performed repeatedly. In the above example, the weld pool 30 and the bridge are formed from the end part 11*a* to the end part 11*b* in the first and second steps. Herein, a similar process is also performed from the end part 11*b* to the end part 11*a*. Accordingly, the following description further includes third and fourth steps corresponding to the first and second steps.

Figure 7:
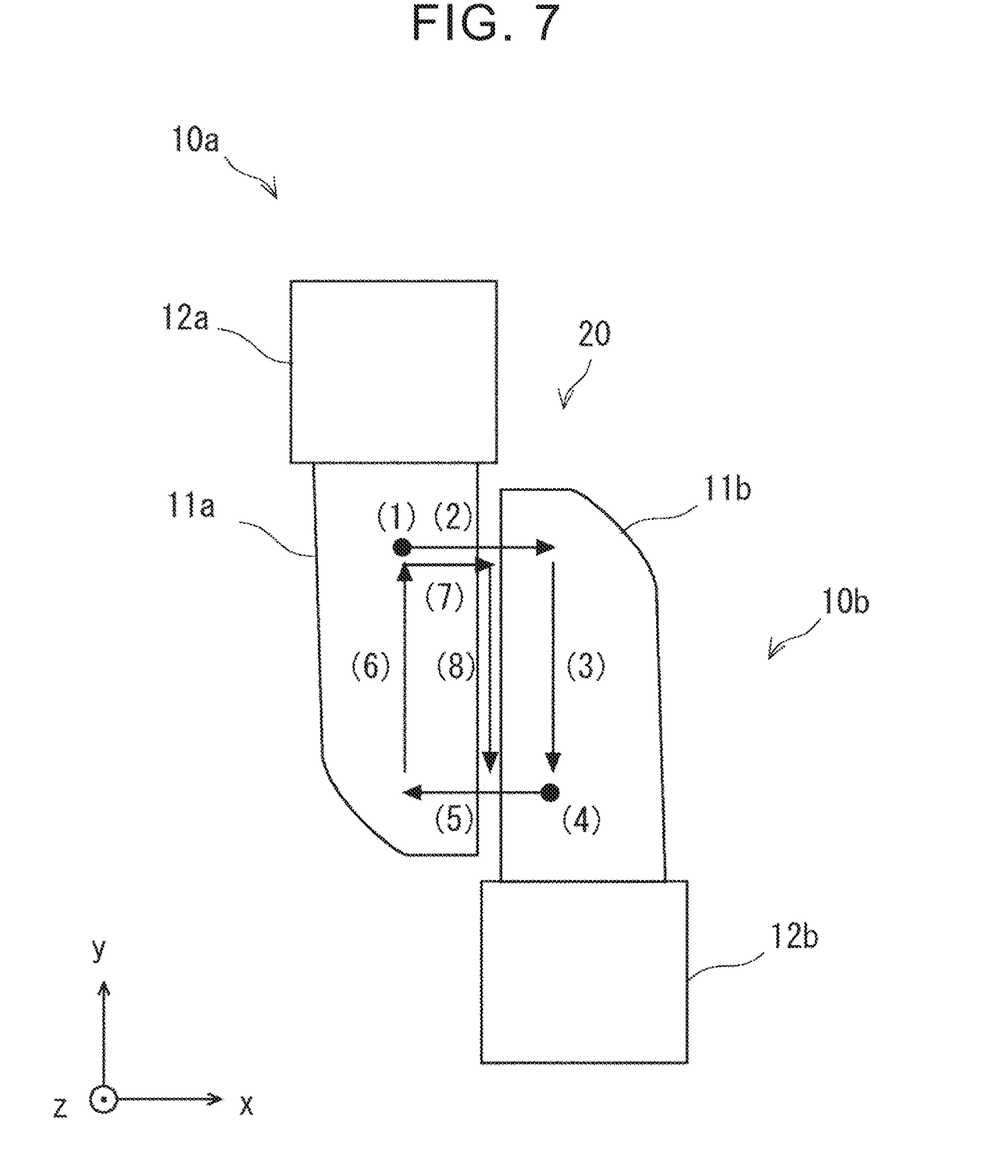
FIG. 7 is a plan view of the joined portion and illustrates the laser welding method according to the embodiment.

FIG. 7 is a plan view of the joined portion 20 and illustrates the laser welding method according to the embodiment. The laser beam L is applied in order of application positions (1) to (8) in FIG. 7 so as to weld the coils 10*a*, 10*b* to each other. FIG. 8 illustrates appearance pictures of the joined portion 20 that correspond to the application positions (1) to (8) of the laser beam L illustrated in FIG. 7.

An application path of the laser beam L will be described with reference to FIG. 7. First, the laser beam L is applied to the end part 11*a* of the coil 10*a* at the application position (1) so as to form the weld pool 30 in the end part 11*a* (the first step).

Then, the application of the laser beam L is continued at the fixed point in the end part 11*a* so as to grow the weld pool 30. Due to the growth and vibration of the weld pool 30, the weld pool 30 is attached to the end part 11*b*. Hereby, the bridge by the weld pool 30 is formed between the end parts 11*a*, 11*b*. After the bridge is formed, the application of the laser beam L to the end part 11*a* is continued until the width of the bridge formed between the end parts 11*a*, 11*b* becomes wider than the width W of the laser beam L (the second step).

Figure 8:
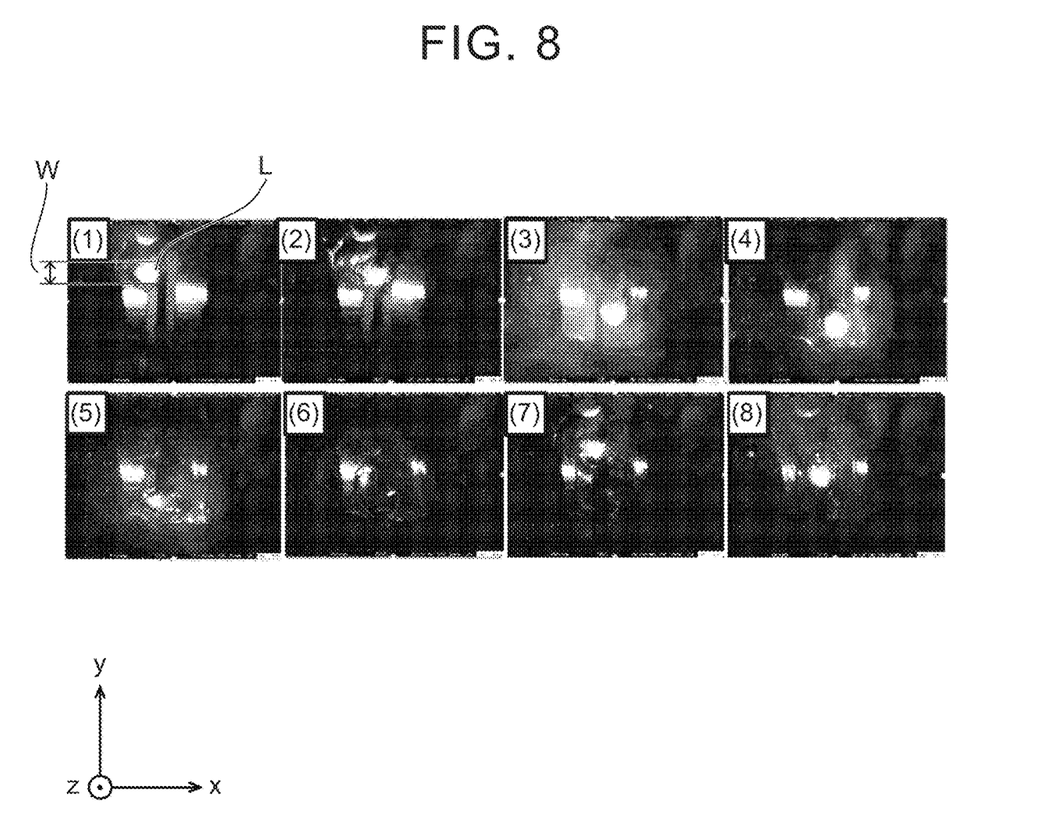
FIG. 8 illustrates appearance pictures of the joined portion and illustrate the laser welding method according to the embodiment.

Hereby, the bridge of the weld pool 30 is formed between the end parts 11*a*, 11*b* such that the bridge is wider than the width W (see (1) in FIG. 8) of the laser beam L. A time during which the application of the laser beam L to the end part 11*a* is continued may be set in advance by use of a high-speed camera or the like.

After the second step, the laser beam L is moved to the end part 11*b* as indicated by the application position (2) in FIG. 7. Since the laser beam L moves over the bridge formed in the first and second steps, the laser beam L can move from the end part 11*a* to the end part 11*b* without penetrating through between the end parts 11*a*, 11*b*.

After the laser beam L is moved to the end part 11*b*, the application of the laser beam L to the end part 11*b* is continued until weld-penetration of the coil is deepened sufficiently in the end part 11*b*. Thus, the joined portion 20 is formed between the end parts 11*a*, 11*b*. Note that the application time of the laser beam L to the end part 11*b* may be set in advance by use of a high-speed camera or the like, similarly to the application time to the end part 11*a*.

Subsequently, as indicated by the application position (3), the laser beam L is moved to the insulating coating 12*b* side (a y-axis negative direction). At the application position (4), the laser beam L is continuously applied to the end part 11*b* so as to form a weld pool 30 (the third step).

Subsequently, the application of the laser beam L is continued at the application position (4) so as to grow the weld pool 30. Due to the growth and vibration of the weld pool 30, the weld pool 30 is attached to the end part 11*a*. Hereby, a second bridge by the weld pool 30 is formed between the end parts 11*a*, 11*b*. After the second bridge is formed, the application of the laser beam L to the end part 11*b* is continued until the width of the bridge formed between the end parts 11*a*, 11*b* becomes wider than the width W of the laser beam L (the fourth step).

Hereby, the second bridge of the weld pool 30 is formed between the end parts 11a, 11b such that the second bridge has a width wider than the width W of the laser beam L. A time during which the application of the laser beam L to the end part 11b is continued may be set in advance by use of a high-speed camera or the like. Further, since the end part 11b has been already heated by the laser beam L, an application time shorter than the application time to the end part 11a to form a first bridge may be set.

After the fourth step, the laser beam L is moved to the end part 11a as indicated by the application position (5). Since the laser beam L moves over the second bridge formed in the third and fourth steps, the laser beam L can move from the end part 11b to the end part 11a without penetrating through between the end parts 11a, 11b.

After the laser beam L is moved to the end part 11a, the application of the laser beam L to the end part 11a is continued until weld-penetration of the coil is deepened sufficiently in the end part 11a. Thus, a second joined portion 20 is formed between the end parts 11a, 11b. Note that the application time of the laser beam L to the end part 11a may be set in advance by use of a high-speed camera or the like, similarly to the application time to the end part 11b. Further, since the end part 11a has been already heated by the laser beam L, an application time shorter than the application time to the end part 11b to form the first joined portion 20 may be set.

Subsequently, as indicated by the application position (6), the laser beam L is moved to the insulating coating 12a side (the y-axis positive direction). Then, as indicated by the application positions (7), (8), the laser beam L is moved to the x-axis positive direction and the y-axis negative direction so as to fill the gap between the end parts 11a, 11b. Thus, the joined portions 20 between the end parts 11a, 11b are integrated, so that the welding between the coils 10a, 10b is completed.

Note that, in FIG. 7, respective arrows indicative of the application positions (1) to (8) are illustrated so as not to overlap with each other, but the application positions (1) to (8) are not limited to this. For example, the end point of the arrow indicative of the application position (6) may overlap with the application position (1). Further, the end point of the arrow indicative of the application position (8) may be on the line of the arrow indicative of the application position (5), for example. Further, in a case where the bridge is formed such that the laser beam L does not penetrate through between the end parts 11a, 11b, the application positions may be set such that the arrows do not overlap with each other as illustrated in FIG. 7.

Further, the application positions of the laser beam L are not limited to those illustrated in FIG. 7. For example, the laser beam L may be applied in a zigzag manner along the y-axis direction.

As described above, with the laser welding method according to the present embodiment, a bridge by the weld pool 30 can be formed so as to cover the gap between the end parts 11a, 11b. Further, since the application of the laser beam L to the end part 11a or 11b is continued until the width of the bridge becomes wider than the width W of the laser beam L, it is possible to restrain the laser beam L from penetrating through the gap between the end parts 11a, 11b.

Accordingly, even in a case where there is a gap between the end parts 11a, 11b, it is possible to restrain the laser beam L from being applied to other members placed below the end parts 11a, 11b. Accordingly, even in a case where other coils 10 or members that are not targeted for welding are placed below the coils 10a, 10b targeted for welding, it is possible to perform welding appropriately while a risk that those members are burned out is reduced. This makes it possible to simplify a clamp jig and to reduce the cost.

Further, with the laser welding method according to the present embodiment, it is possible to form a plurality of bridges between the end parts 11a, 11b by the laser beam L and to apply the laser beam L continuously by causing the laser beam L to reciprocate between the end parts 11a, 11b. Accordingly, it is possible to efficiently perform welding between the coils 10.

Note that the disclosure is not limited to the above embodiment, and various modifications can be made within a range that does not deviate from the gist of the disclosure. For example, only one laser beam L is used in the above-mentioned description, but this disclosure is not limited to this, and a plurality of laser beams L may be used. For example, in a case where two laser beams L are used, applications of the two laser beams L may be started at the same time from the application positions (1), (4) illustrated in FIG. 7 as respective application start positions for the two laser beams L.

What is claimed is:

1. A laser welding method for welding a first member and a second member to each other by applying a laser beam to the first member and the second member in a state where the first member and the second member are brought into contact with each other, the laser welding method comprising:
    forming a first weld pool by applying the laser beam to the first member;
    continuing the application of the laser beam to the first member until a width of a first bridge formed between the first member and the second member becomes wider than a width of the laser beam, the first bridge being formed such that the first weld pool is attached to the second member by growing;
    moving, after the continuing the application of the laser beam to the first member until a width of a first bridge formed between the first member and the second member becomes wider than a width of the laser beam, the laser beam to the second member and continuously applying the laser beam to the second member to form a second weld pool; and
    continuing the application of the laser beam to the second member until a width of a second bridge formed between the first member and the second member becomes wider than the width of the laser beam, the second bridge being formed such that the second weld pool formed in the second member is attached to the first member by growing,
    wherein a time during which the laser beam is applied to the first member is a first predetermined time set after starting the forming the first weld pool, based on an image of a welding state captured by use of a camera, and
    wherein a time during which the laser beam is applied to the second member is a second predetermined time set after starting the forming the second weld pool, based on an image of a welding state captured by use of the camera, the second predetermined time being shorter than the first predetermined time.

2. The laser welding method according to claim 1, wherein the first member and the second member are coils each including an insulating coating.

3. The laser welding method according to claim 1, wherein the first member and the second member are placed at a position where, in a case where the laser beam penetrates through between the first member and the second member, the laser beam is to be applied to a member other than the first member and the second member.

\* \* \* \* \*